United States Patent [19]

Goel

[11] Patent Number: 4,766,201

[45] Date of Patent: Aug. 23, 1988

[54] HYDROXY ALKYL AMIDE THIO ETHER COMPOSITION FROM BIS-BICYCLIC AMIDE ACETAL AND POLYTHIOL

[75] Inventor: Anil B. Goel, Worthington, Ohio

[73] Assignee: Ashland Oil Inc., Ashland, Ky.

[21] Appl. No.: 4,737

[22] Filed: Jan. 20, 1987

Related U.S. Application Data

[63] Continuation of Ser. No. 702,180, Feb. 14, 1985, Pat. No. 4,665,229.

[51] Int. Cl.$^4$ .................. C08G 75/00; C08G 75/02; C08G 83/00

[52] U.S. Cl. .................. 528/374; 428/411.1; 428/419; 428/423.1; 428/425.8; 528/73; 528/74; 528/76; 528/77; 528/85; 564/123; 564/154; 564/201

[58] Field of Search ............ 564/154, 123, 201; 528/374

[56] References Cited

U.S. PATENT DOCUMENTS 4,665,229 5/1987 Goel .................. 528/374

Primary Examiner—Harold D. Anderson
Attorney, Agent, or Firm—John F. Jones

[57] ABSTRACT

The process for preparing hydroxy alkyl amide thio ethers by the reaction of a bicyclic amide acetal with a thiol is described.

2 Claims, No Drawings

HYDROXY ALKYL AMIDE THIO ETHER COMPOSITION FROM BIS-BICYCLIC AMIDE ACETAL AND POLYTHIOL

This is a continuation of copending U.S. patent application Ser. No. 702,180, filed 02/14/85, now U.S. Pat. No. 4,665,229.

This invention relates to novel hydroxy amide thio ether group containing monomers and polymers and more particularly pertains to such materials and their preparation by reaction of a thiol with a bicyclic amide acetal.

Mono- and bis-bicyclic amide acetals are known and more completely described in the copending U.S. patent applications of Anil B. Goel, Ser. No. 641,238 now U.S. Pat. No. 4,605,746 and Anil B. Goel and Harvey J. Richards, Ser. No. 641,242, both filed on Au. 16, 1984.

I have discovered that novel monomers and polymers can be produced by reaction of mono- and bis-bicyclic amide acetals with mono- and poly-thiol compounds. The monomers and polymers thus produced are useful in adhesives, polyurethane synthesis and in numerous other applications. My discovery is in contrast with previous knowledge that bicyclic amide acetals do not normally react with alcohols, including polyols.

For the purpose of this invention, the bicyclic amide acetals include those having the following formulas:

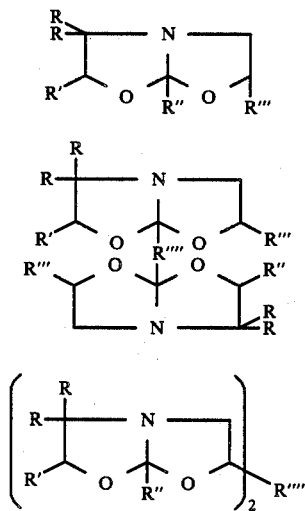

wherein R, R' and R" independently are hydrogen or a hydrocarbon group having from 1-18 carbon atoms, R'" is hydrogen or a hydrocarbon or ether group having from 1 to 20 carbon atoms and R"" is a hydrocarbon or a hydrocarbon ether, ester, amide, or urethane diradical having from 1 to 20 carbon atoms.

Attempted reactions between mono bicyclic amide acetals (I) or bis-bicyclic amide acetals (II or III) and polyols monohydroxy or polyhydroxy compounds such as methanol or ethylene glycol failed to give any product under normal conditions (room temperature to 100° C.). Contrary to this, mono and bis-bicyclic amide acetals react exceedingly rapidly (in most cases, exothermically) with poly thiols to give the corresponding hydroxy alkyl amide thio ether monomers and polymers.

The dithiols and other polythiols useful in the instant invention are well known in the art. Representative of such compounds are those taught in U.S. Pat. No. 3,399,239; and, in general, any polythiol desired to be used in this invention can be prepared in purity that is routinely sufficient by the time honored reaction of an alkali metal hydrosulfide upon a polyhalohydrocarbon, of which each site sought to become a thiol site is initially halogenated. The modest amounts of sulfide and polysulfide usually produced in such process are not usually objectionable in the practice of this invention.

The mono- and polythiols useful in this invention include compounds of the formula $(HS-)_x-L$ wherein L is an alkylene group, an alkylene ether group, an alkylene ester group having at least two carbon atoms, a cycloalkylene group having from 4 to 7 carbon atoms, a substituted cycloalkylene group having from 5 to 12 carbon atoms or an arlyene group having from from 6 to 12 carbon atoms. The alkylene group preferably can have from 1 to about 20 carbon atoms and x represents an integer greater than 1.

Illustrative polythiols useful in this invention are 1,2-ethanedithiol, 1,2-propanedithiol, 1,3-propanedithiol, 1,2,3-propanetrithiol, 1,4-butanedithiol, 3-(1-mercaptoethyl)cyclohexanethiol, 1,2-cyclohexanedithiol, m-xylenedithiol, 1,4-benzenedithiol, toluene-3,4-dithiol, methanonedithiol, 1,1-dimercaptoisooctane, 3,3-pentanedithiol, 1,4-tetramethylenedithiol, 2,2-dimethylpropanedithiol-1,3, decamethylenedithiol, 2,6-dimethyloctanedithiol-3,7, 2,6-dimethyloctanedithiol-2,6, octadecamethylenedithiol 1,1-bis(mercaptomethyl)cyclohexane, 3,4-thiophenedithiol, neopentanetetrathiol, dithiocatechol, dithioresorcinol, dithiohydroquinone, 4,5-dimethyldithioresorcinol, 2,4-dimethyldithioresorcinol, 1,4-naphthalenedithiol, 1,5-naphthalenedithiol, 2,6-naphthalenedithiol, 4,4-dimercaptobiphenyl, and the like.

The process of this invention can be carried out at a temperature in the range of from about room temperature or lower up to about 200° C. or higher, and at a pressure in the range of from about atmospheric up to about 100 atmospheres. The process and compositions of this invention are further illustrated in the following representative examples.

EXAMPLE 1

This example demonstrates the preparation of the compound

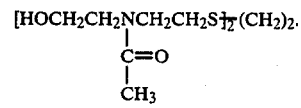

A bicyclic amide acetal having the Formula I in which R, R' and R'" are H and R" is $CH_3$ (26g) was allowed to react with 9.5 g of ethylene dithiol ($HSCH_2CH_2SH$) at room temperature under constant stirring. An exothermic reaction took place. The reaction mixture was stirred for one hour. The resulting viscous liquid showed infrared bands at 3400 $cm^{-1}$ and 1620 $cm^{-1}$ GLC analysis indicated the complete conversion of the bicyclic amide acetal and dithiol to the desired product.

EXAMPLE 2

The synthesis of the compound having the formula

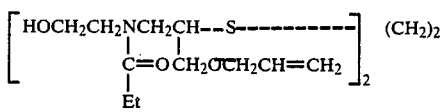

was carried out by reaction of 21.3 g of the disubstituted bicyclic amide acetal having the Formula I in which R and R' are H, R" is Et and R''' is $CH_2OCH_2CH=CH_2$ with 4.7 g of ethylene dithiol by the procedure of Example 1. The viscous liquid product showed IR bands at 3400 cm$^{-1}$ and 1622 cm$^{-1}$ indicating the desired product.

EXAMPLE 3

The synthesis of the compound having the formula

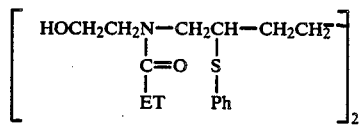

was carried out by the reaction of 1.7 g of the bis-bicyclic amide acetal having the Formula III in which R and R' are H, R" is Et and R'''' is $CH_2CH_2$ with 1.7 g of thiophenol by adding the bis-bicyclic amide acetal dropwise to the thiophenol with constant stirring at room temperature. An exothermic reaction resulted which yielded a viscous liquid. The viscous liquid was stirred for an hour after the addition was completed. The infrared spectrum of the product gave bands at 3395 cm$^{-1}$ and 1625$^{-1}$.

EXAMPLE 4

This Example illustrates the reaction of the methyl substituted bicyclic amide acetal used in Example 1 with polyethylene glycol di(3-mercapto propionate) of two different molecular weights.

A. To 26 g of the methyl substituted bicyclic amide acetal described in Example 1 was added dropwise to 32.6 g of polyethylene glycol di(3-mercapto-propionate) having a molecular weight of 326 with continuous stirring. The reaction was observed to be exothermic. After the completion of the addition of the bicyclic amide acetal, the stirring was continued for one hour at 55° C. The resulting viscous liquid product showed infrared bands at 3400 cm$^{-1}$ and 1622 cm$^{-1}$. The hydroxyl number for the product was 193.

B. To 26 g of the methyl substituted bicyclic amide acetal described in Example 1 was added dropwise 77.5 g of polyethylene glycol di(3-mercapto-propionate); molecular weight of 776. The reaction was carried out as in "A" above. At the end of the addition of bicyclic amide acetal, the resulting viscous product was stirred at 60° C. for three hours to give a clear, viscous liquid. Infrared analysis of the product showed bands at 3400 cm$^{-1}$ and 1623 cm$^{-1}$. The hydroxyl number of the product was found to be 109.

C. A mixture of 40 g of trimethylol propane tri-(3-mercapto propionate) and 39.6 g of the methyl substituted bicyclic amide acetal described in Example 1 was heated with stirring for two hours at 58° C. The resulting liquid product showed infrared bands at 3400 cm$^{-1}$ and 1623 cm$^{-1}$ and the hydroxyl number was determined to be 214.

EXAMPLE 5

This example illustrates the formation of thermoplastic polymers by reaction of bis-bicyclic amide acetals with dithiols.

A. The bis-bicyclic amide acetal described in Example 3, (6.8 g) and 1.9 g of ethane 1,2-dithiol were mixed at room temperature. An exothermic reaction resulted. The reaction mixture was heated at 80°-100° C. with stirring for about an hour to give a thermoplastic polymer. The polymer product was solid at room temperature and became liquid at about 150° C. The infrared analysis of the polymer product showed bands at 3400 cm$^{-1}$ and 1626 cm$^{-1}$. This polymer was tested as a hot melt adhesive between aluminum plates (3–5 mils thickness of polymer) and tensile shear strength (ASTM D1002-64) was found to be about 500 psi.

B. The bis-bicyclic amide acetal described in Example 3 (6.8 g) and 6.5 g of polyethylene glycol di(3-mercapto propionate) (mol wt. 326) were mixed and heated with stirring for one hour at 80°-100° C. The resulting thermoplastic polymer showed infrared bands at 3400 and 1625 cm$^{-1}$. This polymer was tested between aluminum plates (5 mils thickness of polymer) as in "A" of this example and the tensile shear strength was found to be greater than 500 psi.

EXAMPLE 6

This example illustrates the formation of thermoset polymers from bis-bicyclic amide acetals and trithiols.

A. Trimethylol propane tri-(3-mercapto propionate) (3.95 g) was allowed to react for one hour with stirring at about 80° C. with 5.1 g of the bis-bicyclic amide acetal of Example 3. The product was found to be a highly cross-linked (thermoset) polymer which was insoluble in tetrahydrofuran, acetone, dimethyl formamide, and other common solvents. This polymer did not melt when heated up to 200° C. although it did soften some at this temperature. When the above mixture of trimercaptan and bis-bicyclic amide acetal, before curing, was applied in liquid form between two aluminum plates covering a one-inch square area and the resulting structure was heated at 100° C. for 15 minutes, an adhesive bond was formed between the plates which was found to have a lap shear strength of about 525 psi.

B. Polyethylene glycol di(3-mercapto propionate) (molecular weight 326) (6.5g) and trimethylol propane tri(3-mercapto propionate) (2.0 g) were mixed at room temperature with 9.3 g of the bis-bicyclic amide acetal described in Example 3. The resulting viscous liquid was applied between two aluminum plates covering a one-square-inch area. The polymerization reaction was then allowed to take place at 100° C. for 15 minutes. The resulting polymer formed a tough bond between the aluminum plates which was found to have a lap shear in excess of 585 the aluminum sheared first).

EXAMPLE 7

This example illustrates the use of a polyol prepared from a polythiol and a bicyclic amide acetal in an adhesive formulation. The diol described in Example 4A(5.8 g) was mixed with 3.0 g of liquified 4,4'-methylene bis (phenyl isocyanate) and the resulting liquid mixture was used to adhere (i) aluminum sheet to aluminum sheet, (ii) sheet molding compound (SMC) to SMC, and (iii) cold rolled steel sheet to cold rolled steel sheet. In each case, the area of adhesion between sheets was one square inch and the bond thickness was 20-30 mils. The sheet composites were cured at room temperature overnight and at 100° C. for 20 minutes. The shear strength of the bond was tested in each case (ASTM D10002-64) and the steel lap shear strength was found to be 1650 psi whereas the aluminum and SMC materials, rather than the bond, filed at about 580 psi.

I claim:

1. The process for preparing hydroxy alkyl amide thioethers comprising reacting a bicyclic amide acetal conforming to one of the following formulas:

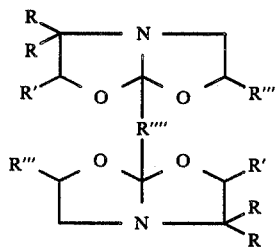

II

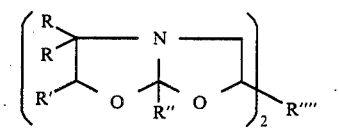

III wherein R, R' and R" independently are hydrogen or a hydrocarbon group having from 1-18 carbon atoms, R'" is hydrogen, a hydrocarbon or an ether group having from 1 to 20 carbon atoms and R"" is hydrocarbon or a hydrocarbon ether, ester, amide or urethane diradical having from 1 to 20 carbon atoms with a thiol conforming to the formula $(HS-)_x-L$ wherein L represents an alkylene group, an alkylene ether group, an alkylene ester group having at least two carbon atoms, a cycloalkylene group having from 4 to 7 carbon atoms, a substituted or cycloalkylene group having from 5 to 12 carbon atoms, or an arylene group having from 6 to 12 carbon atoms and x represents an integer greater than one at a temperature in the range of from about room temperature up to about 200° C. and at a pressure in the range of from about atmospheric up to about 100 atomospheres.

2. The process of claim 1 wherein the bicyclic amide acetal is one of Formula III wherein R and R' are hydrogen, R" is an ethyl group and R"" is an ethylene group and the thiol is eithane.1,2-dithiol.

* * * * *